UNITED STATES PATENT OFFICE.

RUDOLPH D'HEUREUSE, OF NEW YORK, N. Y.

IMPROVEMENT IN PROCESSES OF PREPARING MASH.

Specification forming part of Letters Patent No. 191,942, dated June 12, 1877; application filed August 15, 1876.

*To all whom it may concern:*

Be it known that I, RUDOLPH D'HEUREUSE, of the city, county, and State of New York, have invented new and useful Improvements in Process for Treating Malt, either alone or mixed with starchy matters, so as to produce a wort or sweet-mash, for brewing, distilling, and other purposes; and I hereby declare that the following is a full, clear, and exact description thereof, which will enable others skilled in the art to which it appertains to make and use the same.

This invention consists in preparing mash from mixtures of malt, wort, or extract of malt and unmalted grain, or from malt alone, by using a high pressure, or pressure above atmospheric pressure, without raising the temperature so as to injure the diastase of the malt.

The usual mode of producing a wort or sweet-mash from malt, either alone or mixed with starchy materials, is to mix the malt with water, by some sort of mixer, or to mix the previously-prepared starchy material, in a wet state, with the malt, which is commonly done in an open or covered mash-tun at a temperature of 140° to 175° Fahrenheit, with or without further stirring, and the converting action of the diastase of the malt upon the starch of the material is allowed to run its course, requiring generally from three to six hours to be completed, as far as in this manner it can be accomplished at the ordinary atmospheric pressure.

The treatment in vessels under ordinary atmospheric pressure is defective, for the reason that the saccharifying conversion of the starch in the material is slow and imperfect, the diastase not penetrating to a considerable proportion of the starchy particles, thereby occasioning loss; and the use of steam, as ordinarily employed in the process, at high or low pressure, is objectionable, for the reason that the heat therefrom, above 175° Fahrenheit, destroys the diastase, the acting principle of the malt.

My invention is designed to overcome these defects, by subjecting the malt, or the malt and unmalted material, to a treatment in which is employed a temperature that will not injure the diastase of the malt, say a temperature of 140° to 175° Fahrenheit, or thereabout, and in which are obtained, at the same time, the benefits of a high pressure without such degree of heat as would injure the diastase of the malt.

I will now proceed to describe my process of mashing. The vessel or tank (which may be similar to that described in the patent of J. d'Heureuse, April 25, 1876, No. 176,631, and provided with steam-jacket, or its equivalent, to heat the contents, with a false perforated bottom or plate to drain the liquid, gate for the residue, thermometer, and such other appliances as the nature of the material may require, or any other suitably-constructed vessel will answer) is charged with water of the required temperature, which should not exceed 175° Fahrenheit, although it may be considerably below that—for instance, a good and a mean temperature is 150° Fahrenheit—and with the malt, which is not necessarily crushed or ground, the mixing is effected, the tank closed, and the pressure produced within so as not to raise the temperature of the mash to a degree which would injure the malt, although at the termination of the accomplished saccharification, when the diastase has done its work, the mash may be raised to the boiling-point without injury to the product.

The pressure may be produced by compressed air, carbonic-acid gas, or by any other gas which will not injure the material under treatment, or it may be by means of hydraulic or hydrostatic pressure, or by admission of steam above the surface of the material treated, as the heat acts downward but slightly. Under a pressure maintained at twenty-five pounds per inch and upward, the conversion of the starch takes place rapidly, and the contents of the tank may then be discharged, drained, or otherwise treated, as may be deemed best. The temperature can always be kept up to that required, while the pressure may be raised to any required degree which the vessel will bear, and which the pumps or other compressing devices are capable of producing.

I thus avail myself of the benefits of a high pressure without such degree of heat as would injure the diastase of the malt, so that this diastase is made to quickly penetrate and convert all starch into dextrine and sugar, thereby producing, in less time, more extractive matter from the malt, grain, &c., equivalent to a proportionally larger yield of alcohol than by the old modes.

I have just described the process as carried on upon malt alone. I will now proceed to describe it as worked upon the unmalted material. It is like the former in many respects.

The unmalted starchy material (grain, meal, &c.) is first softened by scalding, steaming, or other known and convenient modes, to open the particles of starch for the subsequent action. This preparatory softening or mashing of the grain may be done in the vessel already described for mashing malt, and which is used for the subsequent steps of the process. If it be not so done, this preparatory mashing is done in any other suitable vessel, after which it is charged into the tank, above described, for mashing malt, and while at a temperature of about 150° to 175° Fahrenheit, a proportion of malt, (generally one-fourth to one-twentieth of the unmalted material,) or an equivalent proportion of wort or extract of malt, is added thereto; the tank is closed, the contents thoroughly mixed, and a pressure is applied to the same by compressed air or gases, by admission of liquids under pressure, or by direct admission of steam above the surface of the contents, as described for malt alone. The saccharification or conversion of the starch into dextrine and sugar takes place rapidly and completely, and when accomplished the contents of the tank are discharged, or otherwise treated.

It will be understood that the mode by which the pressure is produced, for the purposes described, will depend, in each case, upon facilities which favor one mode or another.

Hops may be added to the mash, from malt alone or mixed with starchy or saccharine materials, at the beginning or at some other time of the operation, and either the whole amount of the hops required for the beer to be produced, or only a portion or an excess. The extraction of the hops will thus be performed at the same time of the mashing, and done in a close vessel without loss of volatile parts of the hops.

As the wort obtained by the process described will require, as a rule, less boiling than that produced in the ordinary modes, (without pressure,) this simultaneous extraction of the hops, at the time of mashing, will insure advantages of various kinds.

While I have stated a pressure of twenty-five pounds per inch as a good one to be used in this process, yet it is obvious that it may be more or less, as the condition of the treatment requires.

I do not claim, broadly, the treatment of malt, either alone or mixed with starchy or saccharine material, in an open nor in a close chamber, and under a high pressure of steam, or with or without the use of acids, regardless of the temperature; but Having described my invention, what I claim is—

The process of preparing mash from mixtures of malt, wort, or extract of malt and unmalted grain, or from malt alone, which consists in subjecting the mashing preparation to a temperature ranging from 140° to 175° Fahrenheit, or thereabout, and to a pressure above the atmospheric pressure of fifteen pounds per inch, whereby the saccharification of the starch is expedited without injuring the diastase of the malt, substantially as set forth.

In testimony that I claim the foregoing as my own I affix my signature in presence of two witnesses.

RUDOLPH D'HEUREUSE.

Witnesses:
 D. R. GARDEN,
 W. STANLEY HARRINGTON.